US005683737A

United States Patent [19]
Erickson et al.

[11] Patent Number: 5,683,737
[45] Date of Patent: Nov. 4, 1997

[54] MAYONNAISE AND DRESSING COMPOSITIONS HAVING A GLUCONO-DELTA-LACTONE PRESERVATIVE SYSTEM

[75] Inventors: John P. Erickson, Roselle Park; Mary Deborah Meiners, Piscataway, both of N.J.

[73] Assignee: CPC International Inc., Englewood Cliffs, N.Y.

[21] Appl. No.: 626,097

[22] Filed: Apr. 3, 1996

Related U.S. Application Data

[63] Continuation-in-part of Ser. No. 251,437, May 31, 1994, abandoned.

[51] Int. Cl.$^6$ ..................................................... A23L 1/24
[52] U.S. Cl. ........................... 426/601; 426/602; 426/613; 426/335
[58] Field of Search .................................. 426/601, 602, 426/613, 335

[56] References Cited

U.S. PATENT DOCUMENTS 5,308,639   5/1994   Fung ........................................ 426/602

FOREIGN PATENT DOCUMENTS 56042563   9/1979   Japan.
1137938   11/1987   Japan.
2174668    7/1990   Japan.

OTHER PUBLICATIONS

European Search Report EP 95 30 3679 dated Sep. 29, 1995.
Food Processing 1981 "Ingredients" November issue p. 66.
Food Processing 1981 "Ingredients" November issue p. 67.

Primary Examiner—Carolyn Paden
Attorney, Agent, or Firm—Brooks Haidt Haffner & Delahunty

[57] ABSTRACT

Mayonnaise and dressing products, including reduced-calorie low-fat mayonnaise and reduced-calorie, low-fat, spoonable or pourable dressing compositions, having as a preservative system glucono-delta-lactone and, optionally, acetic acid in sufficient quantity to lower the pH to about 3.5 or less, preferably about 3.3 or less. The compositions have an increased resistance to microbial spoilage and, therefore, extended shelf life compared with currently marketed products, yet do not have the sharp acidic "bite" common to currently available products.

17 Claims, No Drawings

MAYONNAISE AND DRESSING COMPOSITIONS HAVING A GLUCONO-DELTA-LACTONE PRESERVATIVE SYSTEM

CROSS-REFERENCE TO RELATED APPLICATION

This is a continuation-in-part of application Ser. No. 08/251,437, filed May 31, 1994, now abandoned which is incorporated by reference herein in its entirety.

BACKGROUND OF THE INVENTION

1. Field of the Invention

This invention relates to mayonnaise and spoonable or pourable dressing compositions, including reduced-calorie low-fat mayonnaise and reduced-calorie, low-fat, spoonable or pourable dressing compositions, having extended shelf-life and superior resistance to microbial growth. The compositions of the invention also have desirable organoleptic properties and minimal objectionable acidic bite. In particular, the present invention relates to mayonnaise and dressing products wherein glucono-delta-lactone (sometimes referred to herein as "GDL") and, optionally, acetic acid are employed to lower the pH to less than about 3.5 to resist microbial growth.

2. The Prior Art

Shelf stable mayonnaise and salad dressings which are resistant to most forms of food spoilage are commonly available. For example, it is known to food manufacturers to employ a technique known as synergistic preservation to control a wide range of bacteria, yeast, and fungi, and also to minimize the health hazard risks associated with the presence of certain pathogens, such as Salmonella, *Staphylococcus aureus,* and *Listeria monocytogenes.*

Synergistic preservation is based on the interactive, antimicrobial effects of formulation components. These effects are determined by the type and percent of acid(s) and salt(s) used in the formulation, as well as the formulation's pH and water activity ($a_w$). Many pourable particulated dressings also include antimycotic preservatives such as sorbic acid, sodium benzoate, potassium benzoate, and/or potassium sorbate to lengthen shelf-life. In addition, refrigeration has a known bacterio-static effect against microorganisms which are sensitive to low temperatures.

U.S. Pat. No. 4,927,657 discloses what is said to be a reduced tartness salad dressing having a preservation system comprised of at least two edible acids as a complete replacement for conventional acid stabilizing systems (such as 100% acetic or lactic acid) at standard or high total levels of acid. The edible acids are buffered to an increased pH using one or more edible salts to reduce tartness. Sugar is also said to be useful to enhance tartness reduction.

According to U.S. Pat. No. 4,756,919 fumaric acid can be used alone or in combination with a food acidulent to preserve acid containing food products, including salad dressings and mayonnaises, from lactic acid bacteria microbiological spoilage in the absence of or at reduced levels of chemical preservative. In food products which normally use acetic acid as an ingredient, the amount of acetic acid is reduced and fumaric acid is substituted therefor in an amount such that the total amount of titratable acid is the same as it would be if only acetic acid had been used.

Compositions of the mayonnaise and salad dressing type are said to be preserved in the absence of chemical preservatives with a combination of acetic and phosphoric acid according to U.S. Pat. No. 4,145,451. The relative amounts of acetic and phosphoric acid employed are selected by first selecting that amount of acetic acid which provides the desired acid or tart flavor, and selecting the amount of phosphoric acid based on the amounts of moisture, sugar and acetic acid present.

In recent years, reduced calorie "light" mayonnaise and dressing products have been introduced into the marketplace and have gained in popularity. From a microbiological standpoint, these reduced-calorie formulations pose significantly higher spoilage risks than do traditional, full-calorie products. Although reduced-calorie dressings may have similar constituents as full-calorie embodiments, their caloric content is reduced by replacing with water all or part of the oil contained in a full-calorie formulation. However, this replacement of oil with water also may alter the taste of the dressings and, often, compromises bacteriological stability. And even though the incorporation of antimycotic preservatives into reduced-calorie mayonnaise and spoonable and pourable dressing formulations reduces the risk of yeast and/or mold spoilage, it has little or no effect against lactic acid bacteria and certain pathogens.

Because the increased moisture level in reduced-calorie formulations increases the potential for microbiological activity, the demands on the microbiological stabilizing system employed in such formulations are also increased. However, elevating a formulation's acid content to meet these demands creates other problems, as such adjustments significantly affect the formulation's tartness and flavor. Thus, even though low-calorie formulations have been known for over thirty years (see, e.g., U.S. Pat. No. 2,916,383 to Nasarevich et al. and U.S. Pat. No. 2,916,384 to Bondi et al.) food manufacturers continue to seek ways to simultaneously extend the shelf-life and improve the taste of such products.

The use of GDL in edible products has been known for some time. For example, U.S. Pat. No. 3,211,558 to Baur discloses using GDL to inhibit the deposition of high-melting solids ("clouding") in full-calorie salad oils. GDL has also been used as a preservative in a formed pet food product (see, U.S. Pat. No. 4,011,346 to Ernst), and to reduce the amount of thermal processing required for low-acid, heat-sensitive foodstuffs, especially certain vegetables, in order to preserve nutritional and organoleptic properties (see, U.S. Pat. No. 4,741,911 to McIntyre). U.S. Pat. No. 4,931,297 to Malyniak et al. discloses using GDL in required combination with adipic and citric acids in order to preserve foodstuffs without imparting a substantial acidic taste.

GDL has been used as a preservative for non-sterile, partially prepared fruit, pasta, vegetable, meat, poultry, or fish foodstuffs for refrigerated storage (see, PCT Pat. No. WO 91/02465 to Weiss et al.) and for preserving batter-derived food products containing raising agents, such as pancakes and waffles (see, British Pat. No. G.B. 2,036,533 to Burton et al.). Interestingly, GDL also has been used to provide an optimal environment for the growth of Lactobacilli used in a fermentive procedure to preserve protein feed (see, PCT Pat. No. WO 88/04527 to Aaltonen et al.).

Manufacturers have also attempted to reduce the tartness of salad dressing products by employing various mixtures of edible acids to reduce pH yet provide an acceptable-tasting product to the consumer (see, for example, U.S. Pat. No. 4,927,657, discussed above). However, the use of GDL to accomplish such objectives in reduced-calorie formulations has, until the present invention, been unknown.

It is an object of the present invention to provide mayonnaise and spoonable or pourable dressing compositions, including reduced-calorie low-fat mayonnaise or reduced-calorie, low-fat, spoonable or pourable dressing compositions, that have a longer shelf-life than similar products which are currently available.

It is another object of the present invention to provide mayonnaise and spoonable or pourable dressing compositions, including reduced-calorie low-fat mayonnaise or reduced-calorie, low-fat, spoonable or pourable dressing compositions, that have desirable organoleptic properties and minimal objectionable acidic bite.

A further object of the present invention is to provide a method for improving resistance to microbial growth and thereby extending the shelf-life of such compositions, which method consists of adding glucono-delta-lactone and, optionally, acetic acid in sufficient quantity to lower the pH to about 3.5 or less.

Another object of the present invention is to provide a method for improving the resistance to microbial growth and thereby extending the shelf-life of compositions based upon mayonnaise or dressing compositions, including reduced-calorie low-fat mayonnaise or reduced-calorie, low-fat, spoonable or pourable dressing compositions, which method consists of adding to such compositions a constituent mayonnaise or spoonable or pourable dressing composition having as a preservative system glucono-delta-lactone and, optionally, acetic acid in sufficient quantity to lower the pH of the composition to about 3.5 or less.

SUMMARY OF THE INVENTION

The mayonnaise and dressing compositions of the invention have superior resistance to microbial growth, desirable organoleptic properties, and minimal objectionable acidic bite. In particular, glucono-delta-lactone and, optionally, acetic acid are incorporated into mayonnaise and spoonable or pourable dressing compositions, including reduced-calorie low-fat mayonnaise and reduced-calorie, low-fat, spoonable or pourable dressing compositions, in sufficient quantity to lower the pH to about 3.5 or less, preferably about 3.3 or less. In accordance with the invention, glucono-delta-lactone can be used as a preservative in the absence of other acidulents, it can be used in combination with antimycotic agents in the absence of other acidulents, or it can be used in combination with acetic acid, with or without antimycotic agents, in the absence of other acidulents. The shelf stability of the mayonnaise and dressing compositions is extended by the preservative system of the invention while maintaining desirable flavor profiles.

DETAILED DESCRIPTION OF THE INVENTION

The invention relates to the use of GDL to reduce the risk of spoilage by Lactobacilli in mayonnaise and spoonable and pourable dressing compositions, yeasts and other microorganisms.

The compositions of the invention comprise from about 0 to about 60 percent by weight edible oil, from about 10 to about 99 percent by weight moisture, from about 0 to about 30 percent by weight sweetener, and the balance is food solids and a preserving system containing less than about 1% by weight glucono-delta-lactone, preferably in combination with an antimycotic agent (e.g., sorbic acid, benzoic acid, sodium benzoate, potassium benzoate, and/or potassium sorbate) and, optionally, also in combination with acetic acid, to provide a broad-based, synergistic preservative. The compositions of the invention have a pH of less than about 3.5, preferably about 3.3 or less.

Suitable edible oils for use in the invention are those conventionally used to make mayonnaise and dressing products and they include, but are not limited to, the triglyceride oils, or mixtures thereof, derived from oil seeds such as cottonseed, soybean, corn, sesame or safflower. Other oils conventionally used in foods such as olive oil, canola (rapeseed) oil, peanut oil and other vegetable oils are suitable.

Any natural and/or artificial sweeteners conventionally used in foods can be used in the compositions of the invention. Suitable sweeteners include, but are not limited to, sucrose, fructose, dextrose, corn syrup solids, saccharin and aspartame.

Other ingredients which can be used to make the compositions of the invention include, but are not limited to, tomato pulp, beef extract, microcrystalline cellulose, mustard powder, orange peel, pectin, calcium, vegetable and/or fruit puree, skim milk, buttermilk, egg yolk, dehydrated sour cream, nonfat dry milk, food particulates such as bacon, cheese and minced vegetables, salt, pepper, gums such as xanthan and algin derivatives, emulsifiers, starch, dietary fiber, spices and flavorants and the like.

In a preferred embodiment of the invention, glucono-delta-lactone is added to a slurry containing starch, the slurry is heated to hydrolyze the glucono-delta-lactone to gluconic acid and then the slurry is cooled rapidly to avoid damage to the ingredients of the slurry. The heating and cooling steps are carefully controlled, particularly to maintain optimal functionality of the starch in respect of its thickening and binding capacity. The binding capacity, for example, relates to the emulsification functionality in maintaining emulsion/suspension stability. Controlling heating assures a smooth texture in the end product, particularly in so called "light" products where starch replaces some of the oil. Ingredients which are more heat sensitive such as liquid eggs, oil and volatile concentrates, as will be apparent to those skilled in the art, are added after the slurry is cooled. Heating generally is to a temperature of from about 140°–200° F. for from about 30 seconds to about 10 minutes, preferably from about 30 seconds to about 5 minutes and most preferably from about 30 seconds to about 2 minutes. Cooling to ambient temperature then is carried out, immediately following heating, over a period from less than about 5 to about 10 minutes.

Glucono-delta-lactone (Merck Index, ref. 4317 (10th Ed. (1983)) is the self-ester (lactone) of gluconic acid (also variously known as glyconic or glycogenic acid). The Merck Index describes its taste as "sweet," whereas gluconic acid is described as having a "mild acid taste". GDL is hydrolyzed by water (e.g., a 1% aqueous solution has upon formation a pH of 3.6, which changes to pH 2.5 within 2 hours) and exists in solution, as shown in the following equilibrium:

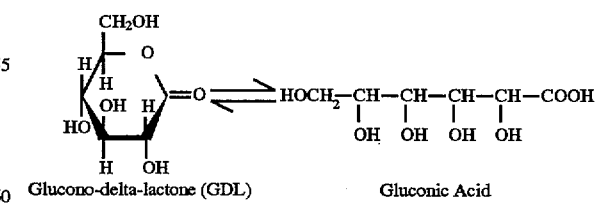

Glucono-delta-lactone (GDL)　　　Gluconic Acid

A second lactone, glucono-gamma-lactone (GGL), wherein the third, gamma carbon away from the carboxyl group is esterified, also exists in such aqueous solutions.

When in aqueous solution, a majority of gluconic acid is formed and the minority remains as a mixture of glucono-delta-lactone and glucono-gamma-lactone.

GDL is described as a "time release" acidulent. In a low-fat or no-fat product in which fat/oil constituents have been replaced with water, the taste of the product may be more adversely affected by the presence of typical antibacterial acidulents such as citric, malic, or tartaric acids than by the presence of GDL.

GDL has been used to preserve low-acid, heat-sensitive canned foodstuffs (U.S. Pat. No. 4,741,911 to McIntyre et al.) and to preserve fruits, pasta, vegetables, meat, poultry, and fish (PCT Pat. No. WO 91/02465 to Weiss et al.). However, both of these publications teach the creation of an equilibrium pH for the product of less than 4.6, preferably 4.3 to 4.6, which is not low enough to prevent the growth of Lactobacilli.

GDL also has been used in combination with adipic and citric acids for preserving a wide range of foods, including high-acid foods (U.S. Pat. No. 4,931,297 to Malyniak et al.); to provide antibacterial protection for liver pate (Robert H. Madden, 52 *J. Food. Protection*, 881 (December 1989)); to extend the shelf life of salads (*Food. Eng.*, September 1989); and to prevent the oxidation of oils containing unsaturated fats (U.S. Pat. No. 3,211,558 to Baur).

Various other references show still further uses of GDL: in bread compositions (JP 79-27885 to Toyo Jozo); as a food preservative in combination with anhydrous sodium acetate (JP 75-21531 to Toyo Brewing); as a preservative in bean paste (JP 74-34821 to Okumo Seiyaku); as a feed preservative (e.g., EP-A 335896, 1989 to Cultor OY); in combination with an antimycotic agent for pet food (U.S. Pat. No. 4,011,346 to Ernst); and for "semi-moist" products (British Pat. No. G.B. 2,036,533 to Burton et al.).

The preservative system of the present invention functions effectively at a pH of about 3.5 or less, preferably about 3.3 or less. The system consists essentially of, and preferably consists of, glucono-delta-lactone and, optionally, acetic acid and/or antimycotic agents. The glucono-delta-lactone is used in a concentration of up to about 1% based on the total weight of the preserved mayonnaise or dressing composition.

According to one embodiment of the present invention, there are provided mayonnaise and spoonable or pourable dressing compositions, including reduced-calorie low-fat mayonnaise and reduced-calorie, low-fat, spoonable or pourable dressing compositions, comprising glucono-delta-lactone and, optionally, acetic acid in sufficient quantity to lower the pH to about 3.5 or less, preferably about 3.3 or less.

According to another embodiment of the present invention, there is provided a method for improving the resistance to microbial growth and thereby extending the shelf-life of such mayonnaise and dressing compositions, which method consists essentially of adding glucono-delta-lactone and, optionally, acetic acid in sufficient quantity to lower the pH to about 3.5 or less, preferably about 3.3 or less, and, in a preferred embodiment, adding antimycotic agents.

There is also provided according to the present invention a method for improving the resistance to microbial growth and thereby extending the shelf-life of compositions based upon mayonnaise and spoonable or pourable dressing compositions, including reduced-calorie low-fat mayonnaise or reduced calorie, low-fat, spoonable or pourable dressing compositions, which method consists essentially of adding to those compositions a constituent mayonnaise and spoonable or pourable dressing compositions, including reduced-calorie low-fat mayonnaise or reduced-calorie, low-fat, spoonable or pourable dressing compositions, having glucono-delta-lactone and, optionally, acetic acid in sufficient quantity to lower the constituent pH to about 3.5 or less, preferably about 3.3 or less.

EXAMPLES

In the following examples all percentages are by weight unless otherwise specified, and all vinegar is 120 grain.

Example 1

A general formula of the composition of the invention has the following ingredients:

| | |
|---|---|
| Starch | 2–10% |
| Sugar | 0–10% |
| GDL | 0.5–3% |
| Acidulent (vinegar) | 1–10% |
| Flavoring | 0–1% |
| Gums (thickeners) | 0–1% |
| Water | 65–95% |

The composition is heated at about 140°–200° F. for about 30 seconds to 10 minutes, to completely or partially hydrolyze the GDL, immediately followed by cooling to ambient temperature over a period of less than about 5 to 10 minutes. Ingredients such as liquid eggs, oils, volatile concentrates and other materials which are very sensitive to heat, as would be apparent to those skilled in the art, are added after cooling.

Example 2

Shelf Stability of Reduced-calorie, Low-fat Mayonnaise

In order to evaluate GDL's effectiveness in extending the shelf life of reduced-calorie, low-fat mayonnaise, three samples were prepared having the formulations set forth in Table 1.

TABLE 1

| Starch Paste Ingredients[1] | M-1 | M-2 | M-3 |
|---|---|---|---|
| Water | 80.2971 | 80.2971 | 79.1366 |
| Starch (Dress'n 400) | 8.2128 | 8.2128 | 8.2128 |
| Sucrose | 3.7941 | 3.7941 | 3.7941 |
| Water (added) | 1.5468 | 1.5468 | 1.5468 |
| Vinegar (120 grain) | 0 | 2.7622 | 5.5244 |
| Potassium Sorbate | 0.1785 | 0.1785 | 0.1785 |
| Xanthan Gum | 0.1785 | 0.1785 | 0.1785 |
| Mustard Flour | 0.1785 | 0.1785 | 0.1785 |
| Lemon Juice (conc. | 0.0893 | 0.0893 | 0.0893 |
| Adjust Water | 4.3639 | 1.6017 | 0 |
| GDL | 1.1605 | 1.1605 | 1.1605 |
| Formulation Ingredients[1] | | | |
| Starch Paste | 56.0099 | 56.0099 | 56.0099 |
| Blended Salad Oil | 32.4955 | 32.4955 | 32.4955 |
| Flavor | 0.2342 | 0.2342 | 0.2342 |
| Egg Yolks (10% salt) | 4.924 | 4.924 | 4.924 |
| Water | 4.8077 | 4.8077 | 4.8077 |
| Salt | 1.5 | 1.5 | 1.5 |
| EDTA[2] | 0.0077 | 0.0077 | 0.0077 |
| Beta Carotene | 0.021 | 0.021 | 0.021 |

[1]All ingredient amounts are expressed in parts by weight.
[2]ethylenediaminetetraacetic acid Sample Formula M-1 contained 0.0% vinegar. Sample Formula M-2 contained 0.1856% vinegar and Sample Formula M-3 contained 0.3712% vinegar. All three formulae contained 0.65% of GDL.

After filling in half-pint jars, the samples were inoculated at high (10,000/g) and low (100/g) Lactobacilli and yeast challenge levels. The test organisms used are listed in Table 2 and are known to be dressings spoilage organisms. Inoculates samples were plated weekly for two months. All products were stored at ambient temperature.

TABLE 2

CHALLENGE STUDY TEST ORGANISMS

| Lactobacillus | Yeast (Saccharomyces) |
|---|---|
| L. brevis (ATCC #8287) | S. bailii (ATCC #36947) |
| L. buchneri (ATCC #4005) | S. acidiaciens (ATCC #36946) |
| L. fermentum (ATCC #14931) | S. rosei (ATCC #10744) |
| L. fructivorans (NRRL-4000, 4002) | S. bailii - raw ingredient isolates |
| L. plantarum (ATCC #14917) | |
| L. bulgaricus (ATCC #11842) | |
| L. casei (ATCC #393) | |

As may be seen by the results listed in Table 3, all three sample formulations proved extremely stable against Lactobacilli. Sample Formula M-1, without added vinegar, proved extremely stable against Lactobacilli and spoilage even at high challenge levels. Sample Formula M-2 with half the normal amount of acetic acid added and Sample Formula M-3, with the normal amount of acetic acid added also were extremely stable against both Lactobacilli and spoilage yeast.

TABLE 3

MICROBIAL STABILITY STUDY OF REDUCED-CALORIE MAYONNAISE WITH GDL MICROORGANISMS PER GRAM

| FORMULA | TYPE[a] | INOCULA LEVEL | 2 WKS | 4 WKS | 6 WKS | 8 WKS |
|---|---|---|---|---|---|---|
| M-1 | L | $1.9 \times 10^4$ | $<10^2$ | $1.8 \times 10^2$ | $<10^1$ | $<10^1$ |
| | L | $1.0 \times 10^2$ | $1.0 \times 10^2$ | $<10^1$ | $<10^1$ | $<10^1$ |
| (pH = 3.3) | Y | $6.6 \times 10^4$ | $<10^2$ | $<10^1$ | $<0.1$ | $<0.1$ |
| | Y | $3.0 \times 10^2$ | $<10^2$ | $<10^1$ | $<0.1$ | $<0.1$ |
| M-2 | L | $2.9 \times 10^4$ | $1.6 \times 10^3$ | $<10^1$ | $<0.1$ | $<0.1$ |
| | L | $1.0 \times 10^2$ | $<10^2$ | $<10^1$ | $<0.1$ | $<0.1$ |
| (pH = 3.22) | Y | $6.1 \times 10^4$ | $1.5 \times 10^3$ | $<10^1$ | $<0.1$ | $<0.1$ |
| | Y | $3.0 \times 10^2$ | $<10^2$ | $<10^1$ | $<0.1$ | $<0.1$ |
| M-3 | L | $2.5 \times 10^4$ | $6.1 \times 10^3$ | $<10^1$ | $<0.1$ | $<0.1$ |
| | L | $3.0 \times 10^2$ | $<10^2$ | $<0.1$ | $<0.1$ | $<0.1$ |
| (pH = 3.15) | Y | $4.1 \times 10^4$ | $<10^2$ | $<10^1$ | $<0.1$ | $<0.1$ |
| | Y | $4.0 \times 10^2$ | $<10^2$ | $<10^1$ | $<0.1$ | $<0.1$ |

[a]Type of microorgansim is designated by L for Lactobacilli and Y for yeast.
$<0.1$ = Negative 10 g Enrichment Analysis. (This means that no viable microorganisms were detected in individual 10 gram product samples tested by conventional enrichment broth recovery methods.)

Example 3

Shelf Stability of Spoonable Reduced-calorie, Low-fat Thousand Island-type Dressing In order to evaluate GDL's effectiveness in extending the shelf-life of reduced-calorie, low-fat spoonable dressing compositions, a Thousand Island-type dressing formulation was prepared using the reduced-calorie, low-fat mayonnaise formulations of Example 2. Each of Example 2 formulations M-1, M-2 and M-3 were combined with tomato ketchup and pickle relish in amounts of 24.184% and 11.971% by weight, respectively, based on the total weight of each dressing formulation. The thousand island formulation using mayonnaise formulation M-1 was designated TI-1, M-2 was designated TI-2 and M-3 was designated TI-3.

Sample Formula TI-1 contained 0.0% vinegar. (Constitutive vinegar was present in the ketchup and relish used.) Sample Formula TI-2 contained 1.547% vinegar and Sample Formula TI-3 contained 3.0942% vinegar. All three samples contained 0.6% of GDL.

After filling in half-pint jars, samples were inoculated at high (10,000/g) and low (100/g) Lactobacilli and yeast challenge levels. The test organisms used are listed in Table 2. Inoculated samples were plated weekly for two months. All products were stored at ambient temperature.

As may be seen by the results listed in Table 4, all three sample formulations proved extremely stable against Lactobacilli. Sample Formula TI-1, without added vinegar, had a pH of about 3.3. This formula proved extremely stable against Lactobacilli even at high challenge levels. It also demonstrated acceptable stability against spoilage yeast due to potassium sorbate present in the reduced-calorie, low-fat mayonnaise base.

Sample Formula TI-2, with half the normal amount of vinegar added, and Sample Formula TI-3, with the normal amount of vinegar added, each had a pH of about 3.1 to about 3.3. Both formulae were extremely stable against both Lactobacilli and spoilage yeast.

TABLE 4

MICROBIAL STABILITY STUDY OF SPOONABLE REDUCED-CALORIE, LOW-FAT THOUSAND ISLAND-TYPE DRESSING WITH GDL

| FORMULA | TYPE[a] | INOCULA LEVEL | MICROORGANISMS PER GRAM | | | | | SPECIAL COMMENTS |
|---|---|---|---|---|---|---|---|---|
| | | | 2 WKS | 4 WKS | 6 WKS | 8 WKS | 3 MOS. | |
| TI-1 | L | $4.7 \times 10^4$ | $6.9 \times 10^3$ | $1 \times 10^3$ | $4 \times 10^1$ | $1 \times 10^1$ | <0.1 | Stable |
| | L | $4 \times 10^1$ | $5 \times 10^1$ | $<10^1$ | $<10^1$ | <0.1 | <0.1 | Stable |
| (0% Vinegar) | Y | $6.1 \times 10^4$ | $6.8 \times 10^2$ | $6.1 \times 10^2$ | $6.4 \times 10^2$ | $2.1 \times 10^5$ | — | Visibly[b] Spoiled |
| | Y | $5.3 \times 10^2$ | $1 \times 10^1$ | $<10^1$ | $<10^1$ | $<10^1$ | $<10^1$ | Stable |
| TI-2 | L | $1.1 \times 10^4$ | $3.6 \times 10^3$ | $3 \times 10^2$ | $1 \times 10^1$ | <0.1 | <0.1 | Stable |
| | L | $9.2 \times 10^2$ | $1 \times 10^1$ | $1 \times 10^1$ | <0.1 | <0.1 | <0.1 | Stable |
| (1.5% Vinegar) | Y | $1 \times 10^4$ | $4 \times 10^1$ | $1 \times 10^1$ | $<10^1$ | <0.1 | <0.1 | Stable |
| | Y | $3.7 \times 10^2$ | $<10^1$ | $<10^1$ | <0.1 | <0.1 | <0.1 | Stable |
| TI-3 | L | $2.5 \times 10^4$ | $1.7 \times 10^3$ | $3 \times 10^2$ | $<10^1$ | <0.1 | <0.1 | Stable |
| | L | $4.1 \times 10^2$ | $3 \times 10^2$ | $<10^1$ | $<10^1$ | <0.1 | <0.1 | Stable |
| (3.09% Vinegar) | Y | $2.9 \times 10^4$ | $5 \times 10^1$ | $<10^1$ | $<10^1$ | <0.1 | <0.1 | Stable |
| | Y | $2.7 \times 10^2$ | $<10^1$ | $<10^1$ | <0.1 | <0.1 | <0.1 | Stable |

[a]Type of microorganism is designated by L for Lactobacilli and Y for yeast.
[b]Overwhelmed by high yeast challenge level.
<0.1 = Negative 10 g Enrichment Analysis Example 4

Shelf Stability of Pourable Reduced-calorie, Low-fat Ranch-type Dressing

In order to evaluate GDL's effectiveness in extending the shelf-life of reduced-calorie, low-fat pourable dressing compositions, the method of Example 3 was repeated using a ranch-type dressing formulation comprising one ounce of Hidden Valley Ranch Original Ranch Salad Dressing Mix, one cup of milk and one cup of reduced-calorie, low-fat mayonnaise base as prepared in Example 2.

Two product samples were prepared. Sample Formula R-1 contained 0.0% vinegar and Sample Formula R-2 contained 1.5471% vinegar. Both samples contained 0.6% of GDL.

After filling in half-pint jars, samples were inoculated at high (10,000/g) and low (100/g) Lactobacilli and yeast levels. The same test organisms as in Example 2 were used. Inoculated samples were plated weekly for two months. All products were stored at ambient temperature.

As may be seen by the results listed in Table 5, Sample Formula R-1 (pH 3.4) showed Lactobacilli spoilage. However, no spoilage was observed in uninoculated control samples, indicating that this formula can be commercially produced under Good Manufacturing Practices (GMPs) and high sanitation standards.

Sample Formula R-2 (pH 3.2) proved extremely stable against Lactobacilli and spoilage yeast. This formula's microbiological stability profile was comparable to those of Sample Formulae TI-2 and TI-3 in Example 2.

TABLE 5

MICROBIAL STABILITY STUDY OF SPOONABLE REDUCED-CALORIE, LOW-FAT THOUSAND ISLAND-TYPE DRESSING WITH GDL

| FORMULA | TYPE[a] | INOCULA LEVEL | MICROORGANISMS PER GRAM | | | | | SPECIAL COMMENTS |
|---|---|---|---|---|---|---|---|---|
| | | | 2 WKS | 4 WKS | 6 WKS | 8 WKS | 3 MOS. | |
| R-1 | L | $3.9 \times 10^4$ | $>10^6$ | $>10^6$ | — | — | — | Spoiled |
| (pH = 3.4) | L | $3.3 \times 10^2$ | $5.2 \times 10^1$ | $1 \times 10^2$ | $>10^5$ | $>10^6$ | — | Spoiled |
| | Y | $4.8 \times 10^2$ | $10^1$ | <0.1 | <0.1 | <0.1 | <0.1 | Stable |
| R-2 | L | $2.0 \times 10^4$ | $5.8 \times 10^1$ | $<10^1$ | $<10^1$ | <0.1 | <0.1 | Stable |
| | L | $2.2 \times 10^2$ | $<10^1$ | $<10^1$ | $3 \times 10^1$ | <0.1 | <0.1 | Stable |
| (pH = 3.22) | Y | $3.4 \times 10^4$ | $5 \times 10^1$ | $<10^1$ | $<10^1$ | <0.1 | <0.1 | Stable |
| | Y | $3.1 \times 10^2$ | $<10^1$ | <0.1 | <0.1 | <0.1 | <0.1 | Stable |

[a]Type of microorganism is designated by L for Lactobacilli and Y for yeast.
<0.1 = Negative 10 g Enrichment Analysis Example 5

Microbiological Safety of Spoonable Reduced-calorie, Low-Fat Thousand Island-type dressing An additional concern of packaged food manufacturers is product safety. In order to evaluate GDL's effectiveness in controlling common food pathogens in reduced-calorie, low-fat, spoonable dressing compositions, a Thousand Island-type dressing formulation was prepared as in Example 3.

The sample formula contained 1.5471% vinegar and 0.6% of GDL. After filling in half-pint jars, samples were inoculated with Salmonella and also with *Listeria monocytogenes*. The test pathogens had been prepared using the following standard protocol:

Thirteen Salmonella strains and five *L. monocytogenes* strains were cultured in tryptic soy-yeast extract broth held at 35° C. for 18 to 24 hours. The pathogens were then pooled in physiological saline after centrifugation. Target samples were inoculated with $10^6$/g of both Salmonella and *L. monocytogenes* and held at 22°–25° C. for the seven-day study duration.

Pathogen lethality survival was monitored via periodic direct plating on nonselective agars (Aerobic Plate Count for Salmonella (Sal.-APC) and Liver Veal-Yeast Extract Agar (LVA-YE) for *L. monocytogenes*) and 10 g or 100 g enrichments were cultured in nonselective broths (Lactose Broth or Liver-Veal Broth) for 18–24 hours, followed by direct plating of 0.1 ml on MacConkey's (Salmonella) or Moxalactam (MOX) (Listeria) Agars, respectively. MacConkey's and MOX Agars are selective plating mediums for the detection/enumeration of Salmonella and *Listeria monocytogenes*, respectively. Direct plates were incubated at 35° for 72–96 hours prior to counting.

As may be seen by the results listed in Table 6, this formulation was extremely lethal to both Salmonella and *L. monocytogenes*. Salmonella were reduced by a factor of six logarithms by the third day of the trial and *L. monocytogenes* was similarly reduced by the fifth day. Thus, it appears that the reduction of pH to a value of about 3.3 or below, at relatively low acetic acid content, evinces in a product of this type a significant bacteriocidal effect.

TABLE 6

MICROBIAL SAFETY STUDY OF SPOONABLE REDUCED-CALORIE, LOW-FAT THOUSAND ISLAND-TYPE DRESSING WITH GDL

| FORMULA | STORAGE TIME | SALMONELLA/g | L. MONO-CYTOGENES/g |
|---|---|---|---|
| Thousand Islands (1.5471% Vinegar) | Level at Inoculation | $7.5 \times 10^6$ | $6.5 \times 10^6$ |
| | 3 DAYS | <10 | $3.9 \times 10^3$ |
| | 5 DAYS | <0.1 | <0.1 |
| | 7 DAYS | <0.01 | <0.01 |

<0.1 = Negative 10 g Enrichment Analysis
<0.01 = Negative 100 g Enrichment Analysis (This means that no viable microorganisms were detected in individual 100 gram product samples tested by conventional enrichment broth recovery methods.)

Example 6

Microbiological Safety of Pourable Reduced-calorie, Low-Fat Ranch-type Dressing

In order to evaluate GDL's effectiveness in controlling common food pathogens in reduced-calorie, low-fat, pourable dressing products, a ranch-type dressing formulation with a pH of 3.4 was prepared, as in Example 4.

The experimental protocol set forth in Example 5 was followed.

As may be seen by the results listed in Table 7, this formulation was also extremely lethal to both Salmonella and *L. monocytogenes*. Salmonella were reduced by a factor of six logarithms by the third day of the trial and *L. monocytogenes* was similarly reduced by the fifth day. Thus, it appears that the reduction of pH to a value of about 3.3 or below also evinces in a product of this type a significant bacteriocidal effect. Refrigeration would presumably enhance the formula's safety by slowing the growth rate of such pathogens.

TABLE 7

MICROBIAL SAFETY STUDY OF POURABLE REDUCED-CALORIE, LOW-FAT RANCH-TYPE DRESSING WITH GDL

| FORMULA | STORAGE TIME | SALMONELLA/g | L. MONO-CYTOGENES/g |
|---|---|---|---|
| Ranch | Level at Inoculation | $1 \times 10^5$ | $4.1 \times 10^5$ |

TABLE 7-continued

MICROBIAL SAFETY STUDY OF POURABLE REDUCED-CALORIE, LOW-FAT RANCH-TYPE DRESSING WITH GDL

| FORMULA | STORAGE TIME | SALMONELLA/g | L. MONO-CYTOGENES/g |
|---|---|---|---|
| (pH = 3.4) | 3 DAYS | <10 | <$10^1$ |
| | 5 DAYS | <0.1 | <0.1 |
| | 7 DAYS | <0.01 | <0.01 |

<0.1 = Negative 10 g Enrichment Analysis
<0.01 = Negative 100 g Enrichment Analysis Example 7

OBJECTIVE:

Determine product formulation parameters involving glucono-delta-lactone, acetic acid and potassium sorbate that will provide a low calorie dressing that is microbiologically stable with regards to Lactobacillus and yeast.

DESCRIPTION OF DATA:

Fourteen low calorie dressings samples were produced according to a three variable Box-Behnken design to determine what effects the levels of glucono-delta-lactone, acetic acid and potassium sorbate had on the microbiological stability of the samples with regards to Lactobacillus and yeast. Table 8 shows the experimental design used in producing the samples. The amounts of acetic acid and GDL set forth in the table refer to percent by weight in the total dressing formula.

Analytical data on the percent acid, pH and percent salt were collected on each product formulation. Samples from each formulation were inoculated with either low (100 organisms per gram) or high (10,000 organisms per gram) levels of Lactobacillus or yeast. The inoculated samples were plated out every two weeks for the first two months to determine if the organisms had died off, survived or grown in number. The inoculated samples were then plated out at 3 months and 4 months.

STATISTICAL METHODS:

Response surface analyses were performed to model the percent acid, pH and percent salt of the formulations as functions of the amounts of GDL, acetic acid and potassium sorbate present. Contour plots were used to graphically illustrate the findings obtained from the regression analyses.

TABLE 8

REGIONS OF LACTIC MICRO-STABILITY

| ACETIC ACID | GD | PREDICTED PH |
|---|---|---|
| 0.00 | 0.65 | 3.26 |
| 0.00 | 0.70 | 3.13 |
| 0.00 | 0.75 | 2.99 |
| 0.00 | 0.80 | 2.86 |
| 0.02 | 0.65 | 3.26 |
| 0.02 | 0.70 | 3.13 |
| 0.02 | 0.75 | 3.00 |
| 0.02 | 0.80 | 2.87 |
| 0.04 | 0.65 | 3.26 |
| 0.04 | 0.70 | 3.13 |
| 0.04 | 0.75 | 3.01 |
| 0.04 | 0.80 | 2.88 |
| 0.06 | 0.65 | 3.25 |
| 0.06 | 0.70 | 3.13 |
| 0.06 | 0.75 | 3.01 |
| 0.06 | 0.80 | 2.89 |

TABLE 8-continued

REGIONS OF LACTIC MICRO-STABILITY

| ACETIC ACID | GD | PREDICTED PH |
|---|---|---|
| 0.08 | 0.65 | 3.25 |
| 0.08 | 0.70 | 3.14 |
| 0.08 | 0.75 | 3.02 |
| 0.08 | 0.80 | 2.91 |
| 0.10 | 0.65 | 3.25 |
| 0.10 | 0.70 | 3.14 |
| 0.10 | 0.75 | 3.03 |
| 0.10 | 0.80 | 2.92 |
| 0.12 | 0.65 | 3.24 |
| 0.12 | 0.70 | 3.14 |
| 0.12 | 0.75 | 3.04 |
| 0.12 | 0.80 | 2.93 |
| 0.14 | 0.65 | 3.24 |
| 0.14 | 0.70 | 3.14 |
| 0.14 | 0.75 | 3.04 |
| 0.14 | 0.80 | 2.94 |
| 0.16 | 0.65 | 3.24 |
| 0.16 | 0.70 | 3.14 |
| 0.16 | 0.75 | 3.05 |
| 0.16 | 0.80 | 2.96 |
| 0.18 | 0.65 | 3.23 |
| 0.18 | 0.70 | 3.14 |
| 0.18 | 0.75 | 3.06 |
| 0.18 | 0.80 | 2.97 |
| 0.20 | 0.65 | 3.23 |
| 0.20 | 0.70 | 3.15 |
| 0.20 | 0.75 | 3.06 |
| 0.20 | 0.80 | 2.98 |
| 0.22 | 0.65 | 3.22 |
| 0.22 | 0.70 | 3.15 |
| 0.22 | 0.75 | 3.07 |
| 0.22 | 0.80 | 2.99 |
| 0.24 | 0.60 | 3.29 |
| 0.24 | 0.65 | 3.22 |
| 0.24 | 0.70 | 3.15 |
| 0.24 | 0.75 | 3.08 |
| 0.24 | 0.80 | 3.01 |
| 0.26 | 0.60 | 3.28 |
| 0.26 | 0.65 | 3.22 |
| 0.26 | 0.70 | 3.15 |
| 0.26 | 0.75 | 3.09 |
| 0.26 | 0.80 | 3.02 |
| 0.28 | 0.60 | 3.27 |
| 0.28 | 0.65 | 3.21 |
| 0.28 | 0.70 | 3.15 |
| 0.28 | 0.75 | 3.09 |
| 0.28 | 0.80 | 3.03 |
| 0.30 | 0.60 | 3.27 |
| 0.30 | 0.65 | 3.21 |
| 0.30 | 0.70 | 3.15 |
| 0.30 | 0.75 | 3.10 |
| 0.30 | 0.80 | 3.04 |
| 0.32 | 0.60 | 3.26 |
| 0.32 | 0.65 | 3.21 |
| 0.32 | 0.70 | 3.16 |
| 0.32 | 0.75 | 3.11 |
| 0.32 | 0.80 | 3.06 |
| 0.34 | 0.55 | 3.29 |
| 0.34 | 0.60 | 3.25 |
| 0.34 | 0.65 | 3.20 |
| 0.34 | 0.70 | 3.16 |
| 0.34 | 0.75 | 3.11 |
| 0.34 | 0.80 | 3.07 |
| 0.36 | 0.55 | 3.28 |
| 0.36 | 0.60 | 3.24 |
| 0.36 | 0.65 | 3.20 |
| 0.36 | 0.70 | 3.16 |
| 0.36 | 0.75 | 3.12 |
| 0.36 | 0.80 | 3.08 |
| 0.38 | 0.50 | 3.30 |
| 0.38 | 0.55 | 3.26 |
| 0.38 | 0.60 | 3.23 |
| 0.38 | 0.65 | 3.20 |
| 0.38 | 0.70 | 3.16 |
| 0.38 | 0.75 | 3.13 |
| 0.38 | 0.80 | 3.09 |

Variations and modifications of the embodiments set forth herein can be effected without departing from the spirit and scope of this invention.

What is claimed is:

1. A mayonnaise or dressing composition having a starch component and comprising an antimicrobial amount of a partially or fully hydrolyzed glucono-delta-lactone wherein the partially or fully hydrolyzed glucono-delta-lactone is present in a concentration up to about 1% by weight, the composition having a pH of about 3.5 or less.

2. The composition of claim 1 further comprising an antimycotic agent.

3. The composition of claim 2 further comprising acetic acid.

4. The composition of claim 2 wherein the antimycotic agent is selected from the group consisting of sorbic acid, benzoic acid, sodium benzoate, potassium benzoate, and/or potassium sorbate.

5. The composition of claim 1 further comprising acetic acid.

6. A reduced-calorie low-fat mayonnaise or spoonable or pourable dressing composition having a starch component and comprising an antimicrobial amount of a partially or fully hydrolyzed glucono-delta-lactone wherein the partially or fully hydrolyzed glucono-delta-lactone is present in a concentration up to about 1% by weight, the composition having a pH of about 3.5 or less.

7. The composition of claim 6 further comprising an antimycotic agent.

8. The composition of claim 7 further comprising acetic acid.

9. The composition of claim 7 wherein the antimycotic agent is selected from the group consisting of sorbic acid, benzoic acid, sodium benzoate, potassium benzoate, and/or potassium sorbate.

10. The composition of claim 6 further comprising acetic acid.

11. A process for producing a mayonnaise or spoonable or pourable dressing composition which is resistant to microbial growth which process comprises heating glucono-delta-lactone in a starch slurry to partially or fully hydrolyze the glucono-delta-lactone and adding the partially or fully hydrolyzed glucono-delta-lactone to the mayonnaise or spoonable or pourable dressing composition in sufficient quantity to lower the pH to 3.5 or less.

12. The process of claim 11 which consists essentially of the addition of the partially or fully hydrolyzed glucono-delta-lactone in the absence of other acidulents.

13. The process of claim 11 wherein an antimycotic agent is added and the antimycotic agent is selected from the group consisting of sorbic acid, benzoic acid, sodium benzoate, potassium benzoate, and/or potassium sorbate.

14. A process for producing compositions made with a reduced-calorie low-fat mayonnaise or spoonable or pourable dressing which process comprises using a reduced-calorie low-fat mayonnaise or spoonable or pourable dressing composition having a starch component and which comprises an antimicrobial amount of a partially or fully hydrolyzed glucono-delta-lactone sufficient to lower the pH of the composition to 3.5 or less.

15. The process of claim 14 which comprises adding the partially or fully hydrolyzed glucono-delta-lactone in the absence of other acidulents.

16. The process of claim 15 comprising the further addition of an antimycotic agent wherein the antimycotic agent is selected from the group consisting of sorbic acid, benzoic acid, sodium benzoate, potassium benzoate, and/or potassium sorbate.

17. The process of claim 14 comprising the further addition of an antimycotic agent wherein the antimycotic agent is selected from the group consisting of sorbic acid, benzoic acid, sodium benzoate, potassium benzoate, and/or potassium sorbate.

* * * * *